United States Patent
Lin et al.

(10) Patent No.: US 7,215,356 B2
(45) Date of Patent: May 8, 2007

(54) 3D STEREO DISPLAY METHOD AND A DEVICE THEREOF

(75) Inventors: Lin Lin, Taichung (TW); Han Chang Lin, Taichung (TW); Wun Hung Wang, Fongyuan (TW)

(73) Assignee: Wintek Corporation, Taichung (TW)

( * ) Notice: Subject to any disclaimer, the term of this patent is extended or adjusted under 35 U.S.C. 154(b) by 331 days.

(21) Appl. No.: 10/958,027

(22) Filed: Oct. 5, 2004

(65) Prior Publication Data

US 2006/0072006 A1  Apr. 6, 2006

(51) Int. Cl.
*H04N 13/04* (2006.01)

(52) U.S. Cl. .............. 348/51; 348/56; 348/55; 348/54; 348/59; 348/42; 348/57; 348/58; 359/466; 359/463; 359/465; 359/462

(58) Field of Classification Search .......... 348/51, 348/56, 55, 54, 57, 58, 59, 42; 359/464, 359/466, 463, 465, 462
See application file for complete search history.

(56) References Cited

U.S. PATENT DOCUMENTS 5,771,121 A * 6/1998 Hentschke .............. 359/463

* cited by examiner

*Primary Examiner*—Shawn S. An
(74) *Attorney, Agent, or Firm*—Bacon & Thomas, PLLC

(57) ABSTRACT

A 3D stereo display method and a device thereof. Two sets of shutters are disposed in a display. The shutters are complimentarily interlaced with each other. The opening/closing of the two sets of shutters are controlled by time interval concept. When the display frequency is odd frequency, one set of shutters is activated. When the display frequency is even frequency, the other set of shutters is activated. The two sets of shutters are continuously opened and closed according to the variation of the frequency so that in odd and even frequencies, the left and right eyes can respectively see independent images formed of different subpixels. Therefore, a 3D display effect is presented to bare eyes without reducing resolution.

4 Claims, 5 Drawing Sheets

3D STEREO DISPLAY METHOD AND A DEVICE THEREOF

BACKGROUND OF THE INVENTION

The present invention is related to a 3D display technique, and more particularly to a 3D stereo display method and a device thereof. Two sets of shutters are disposed in the display. The shutters are complimentarily interlaced with each other. The two sets of shutters are continuously opened and closed according to the variation of the frequency. The visions of the left and right eyes are separated to achieve 3D display effect without reducing resolution.

The existent 3D display technique can be substantially divided into two types. The first type is glasses-type 3D technique. The principle is that through an LCD shutter glasses, the images of left and right eyes are alternately produced to present a 3D image effect on a plane display. Taiwanese Patent Publication No. 454155 discloses such technique. However, it is necessary for a user to wear a pair of specific 3D glasses so that it is relatively inconvenient in use. Moreover, the system is complicated and the manufacturing cost is increased.

The second type is bare-eye 3D technique. The principle is that by means of a shutter design, the images of the left and right eyes are separated to present 3D image on the plane display. Referring to FIG. 4, a TN shutter 81, a display panel 82 and a backlight element 83 are disposed in a liquid crystal display module 8. When the TN shutter 81 is to be transparent, the liquid crystal display module 8 serves as a common liquid crystal display. When the TN shutter 81 is to be opaque, the TN shutter 81 will shade a part of sight. Therefore, the left and right eyes will see different subpixels to achieve 3D visual effect.

However, the shutter will reduce the resolution. With a drawing file with 128×160 original image exemplified, the left eye will see a 64×160 figure and the right eye will see another 64×160 figure. As a whole, the presented 3D image is simply a 64×160 picture. Therefore, it is necessary to provide a measure for solving the problem of reduction of resolution.

SUMMARY OF THE INVENTION

It is therefore a primary object of the present invention to provide a 3D stereo display method and a device thereof. Two sets of shutters are disposed in a liquid crystal display. The shutters are complimentarily interlaced with each other. When the display frequency is odd frequency, one set of shutters is activated. When the display frequency is even frequency, the other set of shutters is activated. In odd and even frequencies, the left and right eyes can respectively see independent images formed of different subpixels. Therefore, a 3D display effect is presented to bare eyes without reducing resolution.

According to the above object, the opening/closing of the two sets of shutters is controlled by time interval concept. When display frequency is odd frequency, one set of shutters is activated. When the display frequency is even frequency, the other set of shutters is activated. In odd and even frequencies, the left and right eyes can respectively see independent images formed of different subpixels and a 3D display effect is presented to bare eyes.

The present invention can be best understood through the following description and accompanying drawings wherein:

DETAILED DESCRIPTION OF THE PREFERRED EMBODIMENT

Please refer to FIGS. 1 to 3B. The liquid crystal display 1 for displaying 3D stereo image of the present invention includes a backlight cell 11. On a light-outgoing side of the backlight cell 11 are disposed a liquid crystal display module 10 and two sets of complementary shutters TN1, TN2 which are interlaced with each other. In this embodiment, the shutters are TN shutters. The shutters TN1, TN2 can be arranged on either side of the liquid crystal display module 10. In this embodiment, the shutters TN1, TN2 are disposed on one side of the liquid crystal display module 10 distal from the backlight cell 11.

The 3D stereo display method of the present invention is such that the opening/closing of the two sets of shutters TN1, TN2 is controlled by time interval concept. When the display frequency is odd frequency, one set of shutters TN1 are activated. When the display frequency is even frequency, the other set of shutters TN2 are activated. Therefore, in odd and even frequencies, the left and right eyes can respectively see independent images formed of different subpixels. Accordingly, 3D display effect can be presented to bare eyes.

Figure 1:
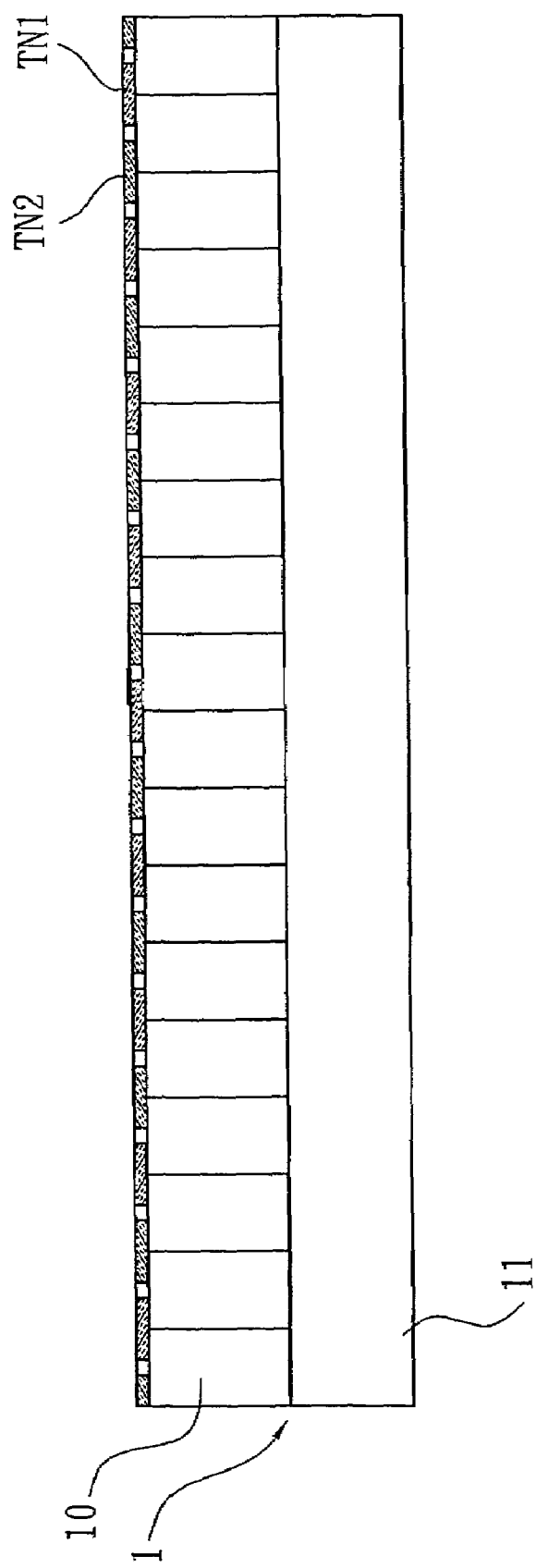
FIG. 1 shows the structure of the display employed by the present invention.
Figure 2:
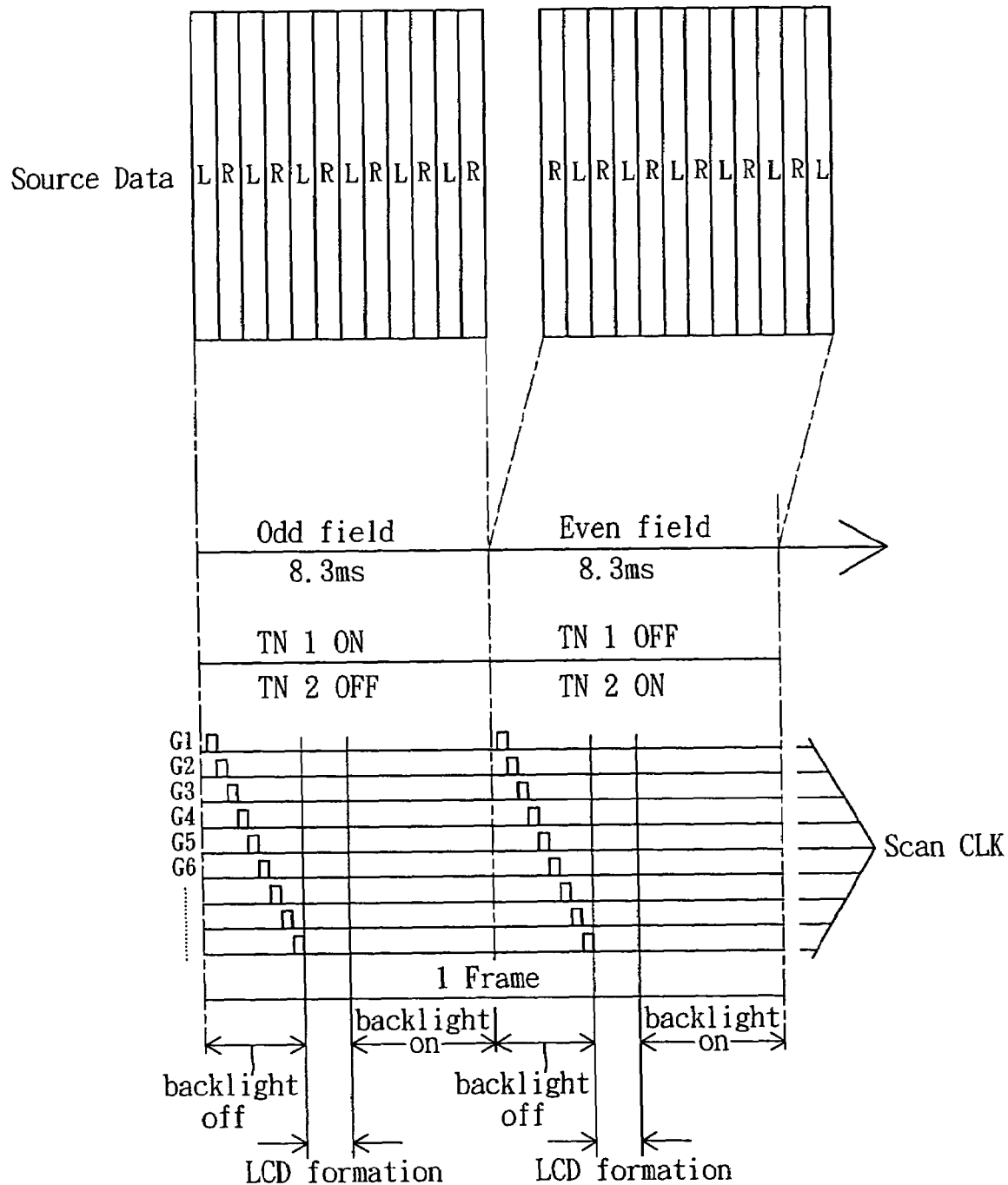
FIG. 2 is a diagram showing the display control principle of the present invention.

The opening/closing of the two sets of shutters TN1, TN2 is such controlled that the display frequency is set at least over 120 Hz. That is, 60 pictures are displayed in each of odd frequency and even frequency. Each opening/closing time of the two sets of shutters TN1, TN2 is kept in 8.3 msec. (less than persistence of vision ) so as to achieve good picture effect. Referring to FIG. 2, the activating time of each of the two sets of shutters TN1, TN2 is 8.3 msec. When the display frequency is within the time interval of the odd and even frequencies, the source data electrode and scan CLK electrode in the liquid crystal display module first scan. After scanned, through LCD formation, the backlight cell 11 is turned on. The time for which the backlight cell 11 is turned on is longer than the scanning time of the source data electrode and scan CLK electrode. (When scanning, the backlight cell is turned off.) Accordingly, the intermittent independent images seen by the left and right eyes in odd and even frequencies can form continuous images due to persistence of vision.

Figure 3A:
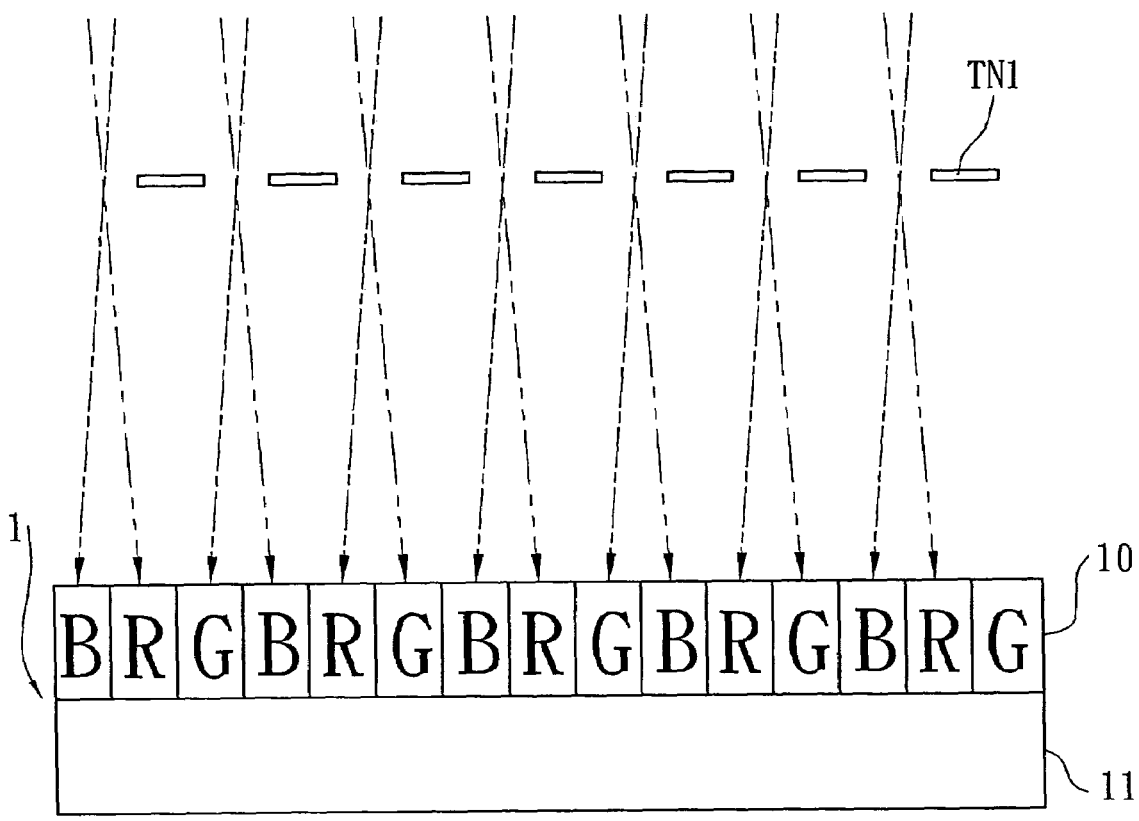
FIG. 3A shows the display state of the present invention in odd frequency.
Figure 3B:
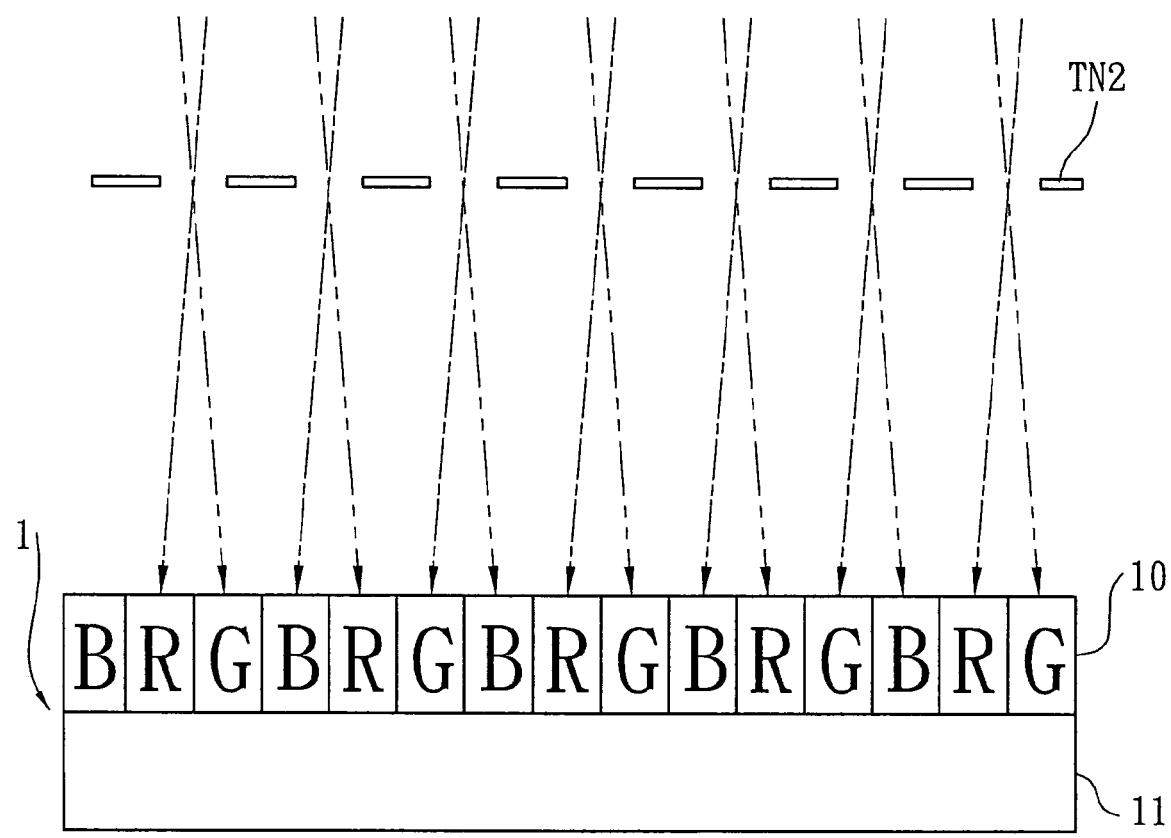
FIG. 3B shows the display state of the present invention in even frequency.
Figure 4:
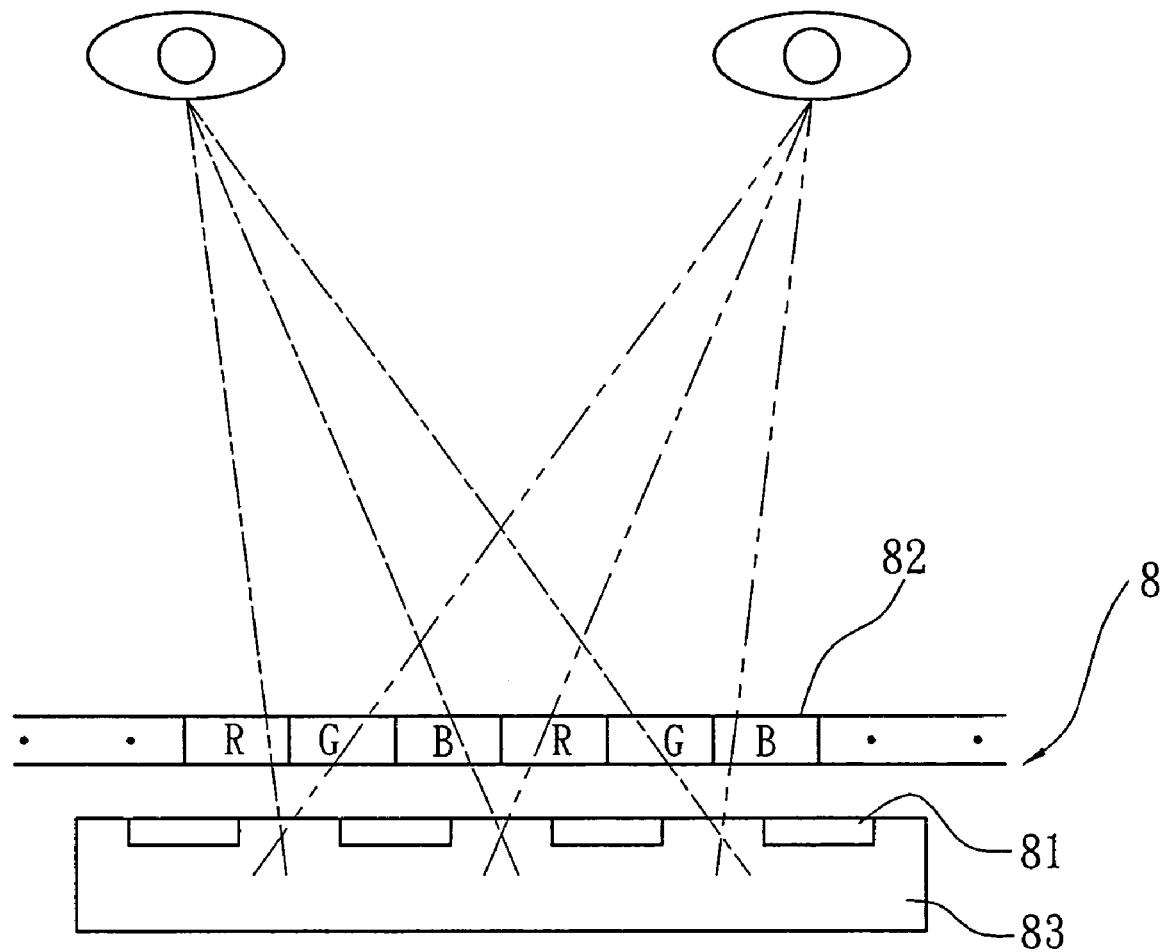
FIG. 4 shows a conventional 3D display method.

Referring to FIGS. 3A and 3B, when the display frequency is in the odd Hz time interval, the shutter TN1 is activated, to be opaque while the shutter TN2 is closed to be transparent. At this time, the left eye can only see the subpixels on right side of each split of the shutter TN1, while the right eye can only see the subpixels on left side of each split of the shutter TN1 as shown in FIG. 3A. With a 128×160 resolution display device, the left eye will see a 64×160 pixel figure and the right eye will see another 64×160 pixel figure. When the display frequency is in the even Hz time interval, the shutter TN1 is closed, while shutter TN2 is activated. At this time, the left eye can only see the subpixels on right side of each split of the shutter TN2, while the right eye can only see the subpixels on left side of each split of the shutter TN2 as shown in FIG. 3B. With a drawing file with 128×160 original image exemplified, the left eye will see a 64×160 pixel figure and the right eye will see another 64×160 pixel figure. The shutters TN1, TN2 are complimentarily interlaced with each other. Therefore, the subpixels respectively seen by the left and right eyes in even Hz are right adjacent to the subpixels respectively seen by the left and right eyes in odd Hz. In other words, during a display period, the left and right eyes will respectively see two sets of different 64×160 pixel figures adjacent to each other. Due to persistence of vision, a human will equivalently see a 128×160 pixel figure. Furthermore, the left and right eyes respectively see different independent images so that 128×160 pixel 3D image is presented to bare eyes.

In conclusion, the shutters TN1, TN2 disposed in the liquid crystal display of the present invention are complimentarily interlaced with each other. In odd Hz, one of the shutters is activated, while in even Hz, the other of the shutters is activated. Accordingly, the left and right eyes will respectively see different subpixels in odd and even frequencies. Without reducing the resolution, a 3D display effect can be achieved.

The above embodiment is only used to illustrate the present invention, not intended to limit the scope thereof. Many modifications of the above embodiment can be made without departing from the spirit of the present invention.

What is claimed is:

1. A 3D stereo display method, two sets of shutters being disposed in a display, the shutters being complimentarily interlaced with each other, the opening/closing of the two sets of shutters being controlled by time interval concept, when display frequency is odd frequency, one set of shutters being activated, when the display frequency is even frequency, the other set of shutters being activated, whereby in odd and even frequencies, the left and right eyes can respectively see independent images formed of different subpixels and a 3D display effect is presented to bare eyes; wherein when the display frequency is within the time interval of the odd and even frequencies, a source data electrode and a scan CLK electrode in the liquid crystal display module first scan, after scanning, a backlight cell for the liquid crystal display module being turned on, the time for which the backlight cell is turned on being longer than the scanning time of the source data electrode and scan CLK electrode.

2. The 3D stereo display method as claimed in claim 1, wherein each opening/closing time of the two sets of shutters is less than persistence of vision time, whereby the intermittent independent images seen by the left and right eyes in odd and even frequencies can form continuous images due to persistence of vision.

3. A liquid crystal display capable of displaying 3D stereo image, comprising a backlight cell, on a light-outgoing side of the backlight cell being disposed a liquid crystal display module and two sets of complementary shutters which are interlaced with each other, the two sets of shutters being respectively activated in odd frequency of the display frequency and in even frequency of the display frequency; wherein the liquid crystal display module including a source data electrode and a scan CLK electrode operable to perform a scan when the display frequency is within the time interval of the odd and even frequencies, after scanning, the backlight cell for the liquid crystal display module being turned on, the time for which the backlight cell is turned on being longer than the scanning time of the source data electrode and scan CLK electrode.

4. The liquid crystal display capable of displaying 3D stereo image as claimed in claim 3, wherein the interlaced shutters are arranged on one side of the liquid crystal display module proximal to the backlight cell or on one side of the liquid crystal display module distal from the backlight cell.

* * * * *